(12) United States Patent
Bekiares et al.

(10) Patent No.: US 9,413,941 B2
(45) Date of Patent: Aug. 9, 2016

(54) METHODS AND APPARATUS TO COMPENSATE FOR OVERSHOOT OF A DESIRED FIELD OF VISION BY A REMOTELY-CONTROLLED IMAGE CAPTURE DEVICE

(75) Inventors: Tyrone D. Bekiares, Chicago, IL (US); Isaac B. Blatter, Salt Lake City, UT (US); Matthew C. Keller, Barrington, IL (US); Steven D. Tine, Buffalo Grove, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 962 days.

(21) Appl. No.: 13/331,308

(22) Filed: Dec. 20, 2011

(65) Prior Publication Data
US 2013/0155182 A1    Jun. 20, 2013

(51) Int. Cl.
*H04N 7/00* (2011.01)
*H04N 5/232* (2006.01)

(52) U.S. Cl.
CPC ................. *H04N 5/23203* (2013.01)

(58) Field of Classification Search
CPC ............ H04N 5/23203; G08B 13/19608; G08B 13/19641; G08B 13/19671; G08B 13/19673
USPC ................................... 348/36, 143
See application file for complete search history.

(56) References Cited

U.S. PATENT DOCUMENTS

| | | | |
|---|---|---|---|
| 5,838,368 A * | 11/1998 | Masunaga et al. | 348/211.9 |
| 6,698,021 B1 * | 2/2004 | Amini et al. | 725/105 |
| 2001/0028395 A1 * | 10/2001 | Kawai et al. | 348/211 |
| 2004/0100563 A1 * | 5/2004 | Sablak et al. | 348/211.4 |
| 2007/0030353 A1 * | 2/2007 | Novak | 348/207.1 |
| 2010/0157049 A1 * | 6/2010 | Dvir et al. | 348/143 |
| 2011/0058036 A1 | 3/2011 | Metzger et al. | |
| 2012/0105599 A1 * | 5/2012 | Lin et al. | 348/50 |

OTHER PUBLICATIONS

International Search Report for counterpart International Patent No. PCT/US2012/069059 mailed Sep. 18, 2013.

\* cited by examiner

*Primary Examiner* — Thai Tran
*Assistant Examiner* — Jose Mesa (57) ABSTRACT

Embodiments include apparatus and methods to compensate for overshoot of a desired field of vision (FOV) by a remotely-controlled image capture device. The image capture device produces images associated with a plurality of FOVs, and transmits the images to a remote viewer terminal along with image identifiers (or FOV definitions for the images). The terminal receives and displays the images to a viewer. In response to viewer indications to pan or stop panning, the terminal sends pan and regress commands, respectively, to the image capture device. A regress command includes a reference to a selected FOV (e.g., an image identifier or an FOV definition). In response to receiving a regress command, the image capture device regresses to the selected FOV, and transmits additional images associated with the selected FOV to the terminal. The system also may include an intermediary device, which performs some of the functions associated with overshoot compensation.

26 Claims, 5 Drawing Sheets

METHODS AND APPARATUS TO COMPENSATE FOR OVERSHOOT OF A DESIRED FIELD OF VISION BY A REMOTELY-CONTROLLED IMAGE CAPTURE DEVICE

FIELD OF THE DISCLOSURE

The present disclosure relates generally to methods and apparatus for remotely controlling a video camera to produce images of different fields of vision, and more particularly to methods and apparatus for compensating for overshoot of a desired field of vision in a system that includes such a remotely controlled video camera.

BACKGROUND

Remotely-controlled video camera systems currently are in use, in which a video camera positioned within a particular area captures and transmits images of the area to a remote viewer terminal over a data path. The received images (i.e., video) may then be displayed to a human operator (or viewer) at the remote viewer terminal.

Some systems include pan-tilt-zoom (PTZ) types of cameras, which are controllable to produce images associated with different fields of vision, where the "field of vision" (or FOV) associated with an image is the extent of the observable world that is conveyed in the image. In such systems, the operator of the remote viewer terminal may remotely control the FOV associated with the images provided by the camera by actuating various PTZ control components (e.g., joysticks) associated with the remote viewer terminal. For example, a remote video camera may be producing images associated with a fixed FOV, and the operator may manipulate a joystick to cause the camera to pan to a different FOV and/or to change the FOV by zooming in or out. Alternatively, if the camera already is panning, the operator may manipulate the joystick to indicate that the operator wants the camera to stop panning, and to provide images associated with a desired FOV. Either way, based on the joystick inputs, the remote viewer terminal sends PTZ directives to the camera (e.g., via the data path) to cause the camera to change its pan angle, tilt angle, or magnification level (e.g., zoom setting) in order to capture images associated with operator-desired FOV.

PTZ control of a video camera by a remote viewer terminal is complicated by the delay associated with the communication loop between the remote viewer terminal and the video camera being controlled. The delay between a remote operator actuating a PTZ control component and the remote operator observing the camera's reaction to the associated PTZ directive typically includes several facets. For example, fixed delays typically include a relatively negligible period of time between the operator actuating a PTZ control component and the remote viewer terminal transmitting an associated PTZ directive, a regular negligible period of time between the camera receiving the PTZ directive and the camera responding accordingly (e.g., by moving the FOV or ceasing such movement), and a relatively significant period of time associated with the processing path between the camera's optics and transmission of the images to the remote viewer terminal (e.g., including various digitization and compression steps). In addition, a relatively significant fixed or variable delay is associated with time that it takes for the remote viewer terminal to process and display a received image (e.g., including various decompression and other image processing steps). Finally, relatively significant, variable, network-imposed delays may be associated with conveying PTZ directives from a remote viewer terminal to the camera, and in conveying encoded images from the camera to the remote viewer terminal. These latter delays may vary based upon the signal conditions of the remote viewer terminal and the camera, the number of attempts necessary to convey a PTZ directive or image, and the current network loading, among other things.

Together, the various delays inherent in a remotely-controlled video camera system may create a frustrating user experience, and in some cases, may render the system unusable for a particular purpose. For example, one particularly frustrating problem is that of PTZ "overshoot." In this scenario, an operator at a remote viewer terminal may manipulate a PTZ control component to command the camera to pan in a particular direction until the operator is viewing images associated with a desired field of vision. Once the images associated with the desired FOV are being displayed, the operator may indicate a desire for the camera to stop panning in the previously commanded direction (e.g., by relinquishing command of the PTZ control component). Because of the inherent delays in the communication loop between the remote viewer terminal and the camera, however, the camera overshoots the desired FOV. Once the operator begins viewing images associated with the overshot FOVs, the operator must manually correct the FOV by manipulating the PTZ control component to instruct the camera to move back in an opposite direction from the previously commanded direction. The camera may then overshoot the desired FOV again, leading to a frustrating oscillation. This problem may be even more frustrating when the operator wants to observe a moving object (e.g., a moving car or person). Accordingly, there is a need for methods and apparatus for better compensating for overshoot of a desired FOV in a remotely-controlled video camera system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Various embodiments are disclosed herein of a remotely-controlled video camera system that includes a remote viewer terminal and a video camera. The camera transmits sequences of images (e.g., video) to the remote viewer terminal over a data network, and the images are subsequently displayed on the remote viewer terminal.

The camera is controllable to change a FOV, with respect to a fixed coordinate system, of images transmitted by the camera to the remote viewer terminal. As used herein, the term "field of vision" or "FOV" means the extent of the observable world that is encompassed by an image that is transmitted by the camera to the remote viewer terminal. Transmitted images alternatively may be referred to herein as being "produced" or "provided" by the camera. The FOV of an image produced by the camera may or may not encompass an entire image that is captured by the camera. For example, an image produced by the camera may include only a portion of an entire image that is captured by the camera (e.g., a portion of a wide-angle image or a subset of the pixels that define a larger image). Accordingly, references made herein to the FOV of an image that is produced by a camera should not be interpreted to mean that the FOV of the image corresponds to an entire image captured by the camera, although that may be the case.

According to an embodiment, the camera is a PTZ-type of camera, which is remotely-controllable to produce images with different FOVs. As used herein, the term "pan" means to change the FOVs of images that are sequentially produced by the camera. The term "pan" is intended to indicate any type of change in the FOVs of sequentially produced images, including FOV changes associated with rotational camera movement about any axis (e.g., panning about one axis and/or tilting about another axis) and FOV changes associated with changes in magnification level (e.g., zooming in or out). Although the term "PTZ" may be used herein in describing example camera embodiments, it is to be understood that embodiments may be incorporated in systems that include cameras capable of changing FOVs about multiple axes, cameras capable of changing FOVs only about a single axis, cameras with zoom capabilities, and cameras without zoom capabilities. In addition, as will be described in more detail later, embodiments may be incorporated in systems in which a drive system is controllable to physically move the camera through a multitude of camera orientations, while capturing images, in order to pan across an observable environment. Other embodiments may be incorporated in systems in which the camera captures wide-angle images (e.g., panoramic images, anamorphic images, 360 degree images, distorted hemispherical images, and so on) and selects sequences of overlapping but offset pixel sub-sets in order to virtually pan across the environment encompassed by the wide-angle images. The term "pan," as used herein, includes both physically moving a camera through multiple camera orientations, and virtually panning a camera by sequentially selecting offset pixel sub-sets within captured, wide-angle images.

An operator of an embodiment of a remote viewer terminal may remotely control the FOVs associated with the images produced by the camera by actuating various control components (e.g., joystick controls and/or other user interface components) associated with the remote viewer terminal. For example, the operator may manipulate a joystick to cause a camera to pan across a scene that is observable by the camera. In addition, the operator may manipulate various control components to cause the camera to zoom in toward or out from a scene. While the camera is panning, the operator may see an image displayed on the remote viewer terminal, which corresponds to a desired FOV (i.e., an FOV at which the operator would like the camera to capture additional images) or which includes an object that the operator may want the camera to maintain within the provided images (e.g., thus defining a desired FOV). According to an embodiment, the operator may then manipulate a control component to indicate that the operator wants the camera to stop panning. When this occurs, the image currently displayed on the remote viewer terminal is considered to be a "selected image." The FOV associated with that image is considered to be a "selected FOV." According to an embodiment, once an image is selected, the remote viewer terminal sends a "regress command" to the camera, which indicates to the camera that it should stop panning in the direction in which it has been panning, and should regress (e.g., pan in a reverse direction) to an orientation (actual or virtual) in which the camera may produce images having substantially the same FOV as the FOV of the selected image. According to a further embodiment, from the time when the operator selects an image to the time when the camera has regressed and the remote viewer terminal begins receiving new images, the remote viewer terminal causes images to be displayed in an altered manner, so that any overshoot of the desired FOV is imperceptible (or less perceptible) to the operator of the remote viewer terminal. Embodiments disclosed herein automatically compensate for overshoot without requiring operator inputs that may otherwise lead to frustrating oscillations around a desired FOV, as occurs in prior systems. Accordingly, the various embodiments may result in a more desirable operator experience. Although the embodiments discussed below particularly discuss overshoot in the context of a camera moving past an orientation associated with a desired FOV, it is to be understood that the various embodiments also could be applied to compensating for overshoot while varying optical magnification levels (e.g., zooming in or zooming out). Accordingly, such embodiments are intended to be included within the scope of the inventive subject matter.

Figure 1:
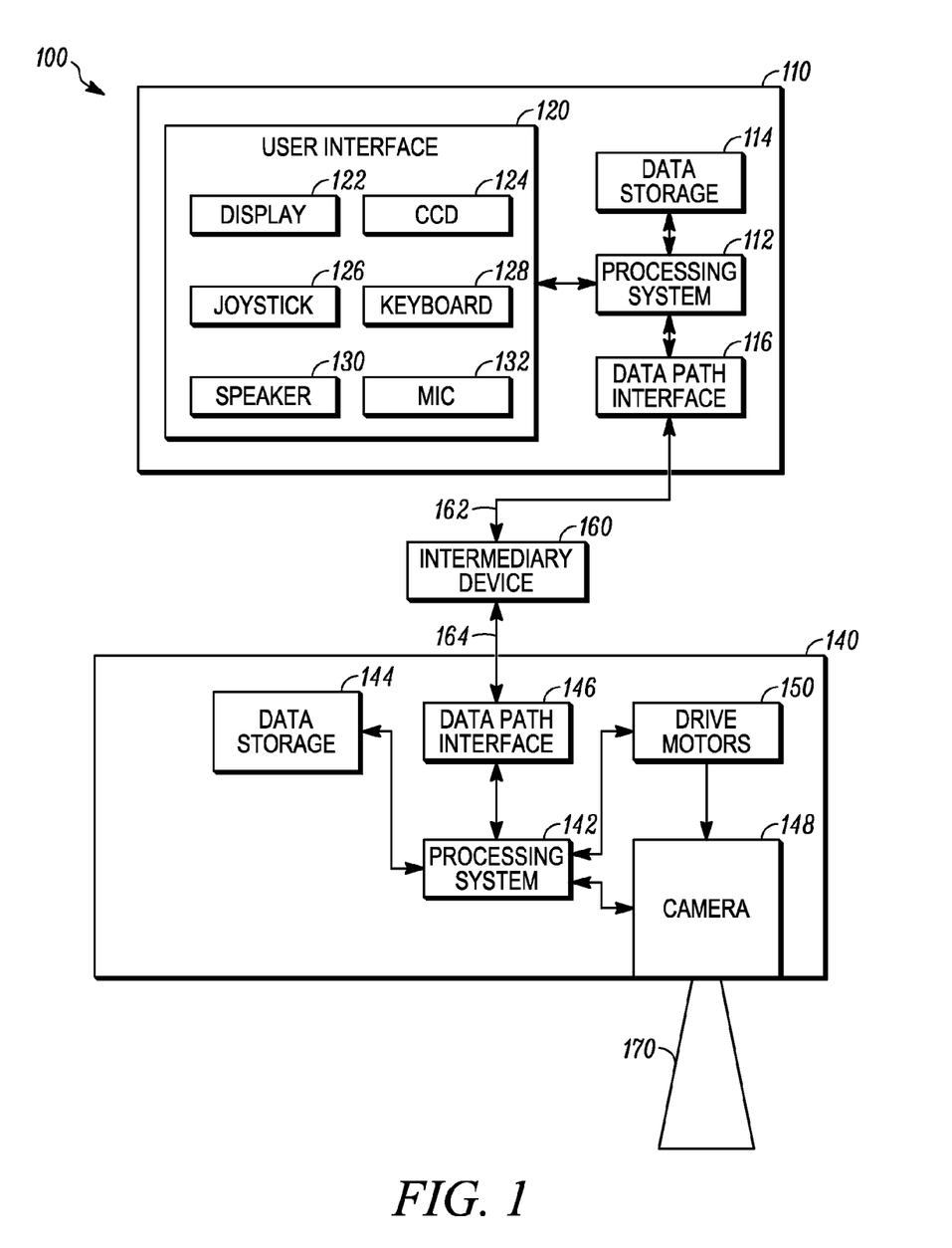
FIG. 1 is a simplified block diagram of a system that includes a remote viewer terminal configured to communicate with a camera over a data path, in accordance with some embodiments.

FIG. 1 is a simplified block diagram of a system 100 that includes a remote viewer terminal 110 configured to communicate with an image capture device 140 (also referred to as a "camera" or "remotely-controlled camera," herein) over a data path, in accordance with some embodiments. The data path may include a single data communications network or multiple, interconnected data communications networks through which the remote viewer terminal 110 and the image capture device 140 communicate. For example, the data path may include various wired and/or wireless networks and corresponding interfaces, including but not limited to the Internet, one or more wide area networks (WANs), one or more local area networks (LANs), one or more Wi-Fi networks, one or more cellular networks, and any of a number of other types of networks. According to an embodiment, an intermediary device 160 (e.g., a server) is present along the data path, thus defining a first portion 162 of the data path between the remote viewer terminal 110 and the intermediary device 160, and a second portion 164 of the data path between the image capture device 140 and the intermediary device 160.

As will be described in more detail later, intermediary device 160 may serve as a conduit for transferring images and commands between image capture device 140 and remote viewer terminal 110. In addition, in an embodiment, intermediary device 160 may receive information from image capture device 140 relating to the identities and FOVs of images being produced by image capture device 140 (including image identifiers, FOV definitions, and so on), and may store that information in conjunction with image identifiers or other information. The stored information may later be used to generate various commands regarding production of images with particular FOVs, as will be described in more detail later.

According to an embodiment, remote viewer terminal 110 and/or image capture device 140 are configured to communicate wirelessly with their respective portions 162, 164 of data path, and accordingly, at least one component of the data path provides a wireless communication interface to image capture device 140 and/or remote viewer terminal 110. In alternate embodiments, either or both remote viewer terminal 110 and/or image capture device 140 may communicate over a hardwired communication link with their respective portions 162, 164 of the data path. In yet another alternate embodiment, remote viewer terminal 110 and image capture device 140 may be directly connected together, in which case the data path may not specifically include a data communications network (or an intermediary device 160). Either way, the data path provides a communication interface between remote viewer terminal 110 and image capture device 140. In a particular embodiment, the data path supports the communication of single images and a stream of images, herein referred to as "video," from image capture device 140 to remote viewer terminal 110, and the communication of various other types of information and commands between the remote viewer terminal 110 and the image capture device 140.

Remote viewer terminal 110 may be, for example, an operator terminal associated with a Public Safety Answer Point (PSAP), although the remote viewer terminal could be a computer or terminal associated with a different type of system or a computer or terminal having no association with any particular system at all. Either way, a human "remote viewer" (not illustrated) interacts with remote viewer terminal 110 in various ways, which will be described in more detail below.

Remote viewer terminal 110 includes a processing system 112, data storage 114, data path interface 116, and user interface 120, in an embodiment. Data path interface 116 enables the remote viewer terminal 110 to communicate over the data path with the image capture device 140 and/or the intermediary device 160. Data path interface 116 includes apparatus configured to interface with whatever type of data path is implemented in the system 100 (e.g., data path interface 116 may facilitate wired or wireless communication with a network of the data path, or may facilitate communication with image capture device 140 over a direct connection).

Processing system 112 may include one or more general-purpose or special-purpose processors, which are configured to execute machine readable software instructions that are stored in data storage 114. The machine readable software instructions may correspond to software programs associated with implementing various example embodiments. As will be discussed in more detail below, the software programs include programs that interpret user inputs to various input devices of user interface 120, cause a display 122 to display various images and other information, interface with data storage 114 to store and retrieve data, coordinate the establishment and maintenance of voice and data communication paths with image capture device 140 over the data path, process data (e.g., images, image identifiers, and so on) received over the data path from image capture device 140, and generate commands (e.g., pan commands, regress commands, and so on) to be transmitted over the data path to image capture device 140 and/or intermediary device 160.

Data storage 114 may include random access memory (RAM), read only memory (ROM), compact disks, hard disks, and/or other data storage devices. Data storage 114 is configured to store software instructions (as mentioned above) and additional data associated with the performance of the various embodiments. For example, data storage 114 is configured to store data representing captured images, which have been received from image capture device 140. In addition, data storage 114 is configured to store image identifiers and/or FOV references received from intermediary device 160 and/or from image capture device 140 in conjunction with the image data.

User interface 120 includes various input and output devices that enable the remote viewer to interact with remote viewer terminal 110. For example, user interface 120 may include one or more of each of the following types of input and output devices: display 122, cursor control device (CCD) 124, joystick 126, keyboard 128, speaker 130, and microphone (MIC) 132. As will be described in more detail below, the various input devices (e.g., display 122 (when it is a touchscreen), CCD 124, joystick 126, keyboard 128, and microphone 132) enable the remote viewer to select currently displayed or previously displayed images or objects, and to indicate various FOV control commands to the image capture device 140. As used herein, an "FOV control command" is a command to the image capture device 140 which, when followed by the image capture device 140, affects the FOVs of images produced by the image capture device 140. For example, the input devices could be used to initiate FOV control commands such as pan-related commands (e.g., pan left, pan right, pan up, pan down, stop panning, and so on), magnification adjustment commands (e.g., increase magnification (zoom in), decrease magnification (zoom out), and so on), and regress commands (e.g., regress to an orientation associated with a selected FOV).

Under the control of processing system 112 (or a display controller associated therewith), display 122 is configured to display images (e.g., still images and video) conveyed in image data from image capture device 140. In addition, display 122 may be utilized to display various other types of information (e.g., textual information, select lists, selectable icons, and so on). Display 122 may be a touchscreen or non-touchscreen type of display. In the former case, display 122 is considered both an input and an output device, and the remote viewer may select various displayed images and/or objects by touching corresponding portions of the touchscreen. In the latter case, display 122 is considered an output-only device.

CCD 124 may include any one or more devices that enable the remote viewer to select a displayed image or object, such as a mouse, touchpad, button, and so on. In addition, in an embodiment in which display 122 is a touchscreen type of display, those aspects of display 122 that provide the touchscreen capabilities may be considered to be portions of CCD 124. As will be described in more detail later, CCD 124 enables the remote viewer to select an image and/or an object within an image, where that selection may be used to determine a desired FOV for images provided by the image capture device 140. Consistent with the image or object selections specified via CCD 124, display 122 or some other input device, processing system 112 generates and transmits FOV control commands to the image capture device 140, as will be explained in more detail later. As will also be described in detail later, upon receiving such FOV control commands, the image capture device 140 provides (e.g., transmits to remote viewer terminal 110) images having FOVs that are consistent with the FOV control commands.

Joystick 126 may include one or multiple sticks, which pivot on a base, and a processing component that interprets and reports stick angle and/or stick direction information to processing system 112. Joystick 126 also may include one or more additional buttons or controls, which enable the remote viewer to change the joystick mode of operation, indicate a selection, and/or indicate a desired change in an optical magnification level of the image capture device 140. For example, as will be described in more detail later, a remote viewer may want the image capture device 140 to pan in a particular direction, so that the camera 148 of the device 140 may capture images in a different FOV from its current FOV (e.g., FOV 170). Alternatively, a remote viewer may want the image capture device 140 to stop panning. In addition, a remote viewer may want the image capture device 140 to cause its camera 148 to increase or decrease an optical magnification level in order to zoom in or zoom out, respectively, while the image capture device 140 is capturing images. These desired changes may be indicated through manipulations of joystick 126, in an embodiment, or through manipulations of other components of user interface 120, in other embodiments.

According to an embodiment, when the image capture device 140 is configured to physically change an orientation of camera 148 with respect to a fixed coordinate system in order to pan, joystick 126 may enable the remote viewer to indicate that the remote viewer wants the image capture device 140 to change the orientation of the camera 148 (e.g., pan left, pan right, pan up, pan down), to stop panning (e.g., when the operator releases the first stick), or to change the optical magnification level. Conversely, when the image capture device 140 captures wide-angle images and virtually pans by selecting portions of the wide angle images (rather than changing the physical orientation of the camera 148), joystick 126 may enable the remote viewer to indicate that the remote viewer wants the image capture device 140 to select portions of the wide-angle images captured by camera 148 in a manner that simulates panning (e.g., pan left, pan right, pan up, pan down), to stop simulated panning (e.g., when the operator releases the joystick), or to change the optical magnification level.

In alternate embodiments, panning and magnification change requests may be stipulated by the remote viewer by manipulating keys on keyboard 128 (e.g., arrow keys), selecting (via CCD 124) orientation and/or directional indicators displayed on display 122, or typing (via keyboard 128) various commands. Either way, as will be described in detail later, processing system 112 generates and transmits FOV control commands to the image capture device 140, which are consistent with the inputs to joystick 126 (e.g., the stick angle and/or stick direction information produced by joystick 126) or other user interface components. As will also be described in detail later, upon receiving such FOV commands, the image capture device 140 provides (e.g., transmits to remote viewer terminal 110) images having FOVs that are consistent with the FOV control commands. When an FOV control command corresponds to an optical magnification level change, the image capture device 140 automatically (i.e., without interaction with the device operator) may adjust the optical magnification level according to the command.

Keyboard 128 may be a standard QWERTY keyboard, or a specialized keyboard that is configured to enable a remote viewer to input information via various keys. For example, via keyboard 128, a remote viewer may provide textual FOV related instructions, and/or information that may be converted into FOV control commands (e.g., geographical coordinates, and so on). In addition, the remote viewer may be able to indicate selection of an image or object via keyboard 128.

Although FIG. 1 illustrates the remote viewer terminal 110 as a stand-alone device that communicates with the image capture device 140 via a data path, it is to be understood that the remote viewer terminal 110 may form a portion of a larger system (e.g., a PSAP system). Such a system may include multiple remote viewer terminals, routing equipment, data and communication server(s), and so on. In addition, although FIG. 1 depicts processing system 112 and data storage 114 as being incorporated in remote viewer terminal 110, it is to be understood that some functions associated with the various embodiments could be performed outside the remote viewer terminal 110 (e.g., by intermediary device 160). In addition, some software programs and/or data may be stored in data storage devices that are distinct from the remote viewer terminal 110.

Image capture device 140 may be any one of various types of devices, including but not limited to a panning camera, a pan/tilt (PT) camera, a PTZ camera, a panoramic camera (e.g., a 360 degree camera), a fisheye camera, and a box camera. Image capture device 140 includes a processing system 142, data storage 144, data path interface 146, and camera 148, in an embodiment. In embodiments in which image capture device 140 is configured to physically change the orientation of camera 148 in order to change the FOV of images produced by image capture device 140, image capture device may also include one or more drive motors 150.

Data path interface 146 enables the image capture device 140 to communicate over the data path with the remote viewer terminal 110 and/or intermediary device 160. Data path interface 146 includes apparatus configured to interface with whatever type of data path is implemented in the system 100 (e.g., data path interface 146 may facilitate wired or wireless communication with a network of the data path, or may facilitate communication with remote viewer terminal 110 over a direct connection).

Processing system 142 may include one or more general-purpose or special-purpose processors, which are configured to execute machine readable software instructions that are stored in data storage 144. The machine readable software instructions may correspond to software programs associated with implementing various example embodiments. As will be discussed in more detail below, the software programs include programs that cause camera 148 to capture images, determine and store camera orientation information (e.g., drive motor settings associated with captured images), interface with data storage 144 to store and retrieve data (e.g., image data, image identifiers, and/or FOV definitions), coordinate the establishment and maintenance of data communication paths with remote viewer terminal 110 and/or intermediary device 160 over the data path, process information (e.g., FOV control commands, and so on) received over the data path from remote viewer terminal 110 and/or intermediary device 160, and coordinate processing and transmission of image data and image identifiers (or FOV definitions) over the data path to remote viewer terminal 110 and/or the intermediary device 160.

Data storage 144 may include RAM, ROM, compact disks, hard disks, and/or other data storage devices. Data storage 144 is configured to store software instructions (as mentioned above) and additional data associated with the performance of the various embodiments. For example, data storage 144 is configured to store data representing images that have been captured by camera 148, image identifiers, and FOV definitions.

Camera 148 is a digital camera configured to capture images within its FOV 170, and to convert those images into image data. Under control of processing system 142, camera 148 may be controlled to capture still images and/or to capture video (e.g., continuous streams of still images), and to convert the captured images into image data. In an embodiment, camera 148 and/or processing system 142 compresses the image data prior to storing the image data in data storage 144, although the image data may be stored in an un-compressed format, as well. "Image data," as used herein, refers to data, in compressed or un-compressed formats, that defines one or more captured images.

Camera 148 may be capable of capturing either or both relatively low-resolution images (e.g., images represented using hundreds of kilopixels (e.g., a two dimensional array of 100-1000 pixels by 100-1000 pixels, or some other number)) and relatively high-resolution images (e.g., images represented using a number of megapixels (e.g., a two dimensional array of 1000-10,000 pixels by 1000-10,000 pixels, or some other number)), at various times. According to an embodiment, camera 148 also includes zoom capabilities (i.e., variable optical magnification of the FOV 170), which may be remotely controlled via commands received from remote viewer terminal 110. The term "optical magnification" is used herein to denote any adjustment to the magnification of the captured FOV 170 or the FOV of an image produced by the image capture device 140, whether instrumented through manipulation of the lens, and/or through subsequent digital processing of a captured images (e.g., through digital zoom, which selects subsets of pixels from a captured image).

As discussed previously, the FOV 170 of camera 148 may substantially coincide with the FOV of an image produced by image capture device 140 (e.g., transmitted by image capture device 140 to remote viewer terminal 110), or the FOV 170 of camera 148 may be larger than the FOV of an image produced by image capture device 140. Processing system 142 is configured to control image capture by camera 148, and also to produce images (e.g., transmit the images to remote viewer terminal 110) from the captured images. As discussed previously, the FOV of an image produced by image capture device 140 may coincide with the FOV 170 of the camera 148, or the FOV of an image produced by the image capture device 140 may be smaller than the FOV 170 of the camera 148. For example, processing system 142 may produce an image from a captured image by selecting a set of pixels of a captured image to be represented in the produced image, and performing various image processing functions (e.g., filtering, un-warping, conversion from a distorted (e.g., wide angle or hemispherical) image to a conventional rectilinear image, compression, anti-aliasing, and so on). The pixels selected by the processing system 142 define the FOV of the image produced by the image capture system 140. Accordingly, each image produced by the image capture device 140 is associated with an FOV.

In some cases, the FOV 170 of camera 148 is centered about a direction that is perpendicular to a lens (not illustrated) of camera 148. In other cases, the FOV 170 of camera 148 may encompass images captured through multiple lenses (not illustrated) of camera 148. Either way, camera 148 may produce standard rectilinear images, wide-angle images (e.g., panoramic or 360 degree images), distorted hemispherical images, or other types of images, in various embodiments.

In order to physically pan across a scene in any particular direction, image capture device 140 may change the FOV 170 of the camera, in some embodiments. For example, processing system 142 may provide commands to drive motors 150, which cause the actual physical orientation of camera 148 to change with respect to a fixed coordinate system (e.g., by rotating camera 148 about one or more axes). According to an embodiment, information indicating the current settings of drive motors 150 (and thus the physical orientation of camera 148) may be periodically or occasionally determined by processing system 142 and stored in data storage 144. For example, the drive motor settings may be stored in conjunction with image identifiers, so that the image capture device 140 can return the camera 148 to an orientation associated with a particular image based on the drive motor settings stored in conjunction with the image identifier for that image.

Figure 2:
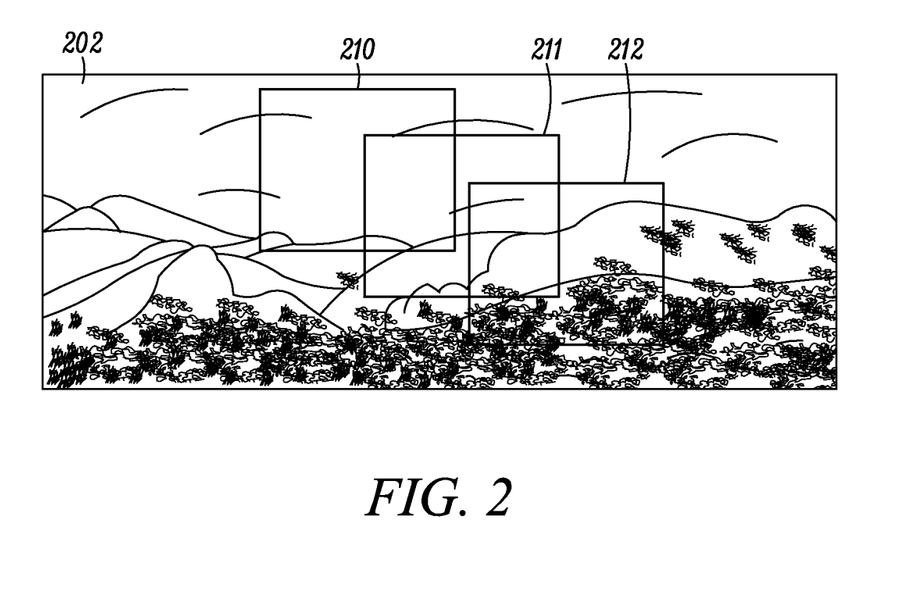
FIG. 2 depicts an example of a super-set of pixels corresponding to a wide-angle image from which a sequence of sub-images may be produced to achieve virtual panning, in accordance with some embodiments.

Alternatively, image capture device 140 may be configured to virtually pan across a scene. For example, camera 148 may be configured to capture wide-angle images (e.g., using a wide-angle lens, an anamorphic lens, a fisheye lens, an ultra-wide angle lens, or another type of lens that has a greater FOV than a standard lens), and image capture device 140 may virtually pan by producing offset (and typically overlapping) sub-images (i.e., portions) of one or more of the images. The camera 148 may use a high resolution sensor to record the entire, wide-angle FOV as a super-set of pixels. For example, FIG. 2 depicts a wide-angle image represented as a super-set of pixels 200 recorded by a high resolution sensor. In order to virtually pan across the image 200, image capture device 140 may select a plurality of offset pixel sub-sets 210, 211, 212 from image 200. The image capture device 140 may digitally unwarp distortion that may have been caused by the wide-angle lens (optionally), and may provide a plurality of sub-images corresponding to the plurality of offset pixel sub-sets 210-212 to the remote viewer terminal 110. As indicated in the example of FIG. 2, each pixel sub-set 210-212 is offset in both the vertical and horizontal direction from the image that preceded it (although each pixel sub-set may be offset in only one direction, as well). In this way, sequentially provided sub-images corresponding to the pixel sub-sets 210-212, when displayed in sequence, produce the appearance that the image capture device 140 is panning across a scene, even though the physical orientation of the camera 148 does not change. The image capture device 140 may produce multiple images from a single wide-angle image that is captured by the image capture device 140, as discussed above, or may produce multiple images from multiple wide-angle images that are captured by the image capture device 140. In other words, the image capture device 140 may pan across a single wide-angle image, or may pan across multiple wide-angle images.

Figure 3:
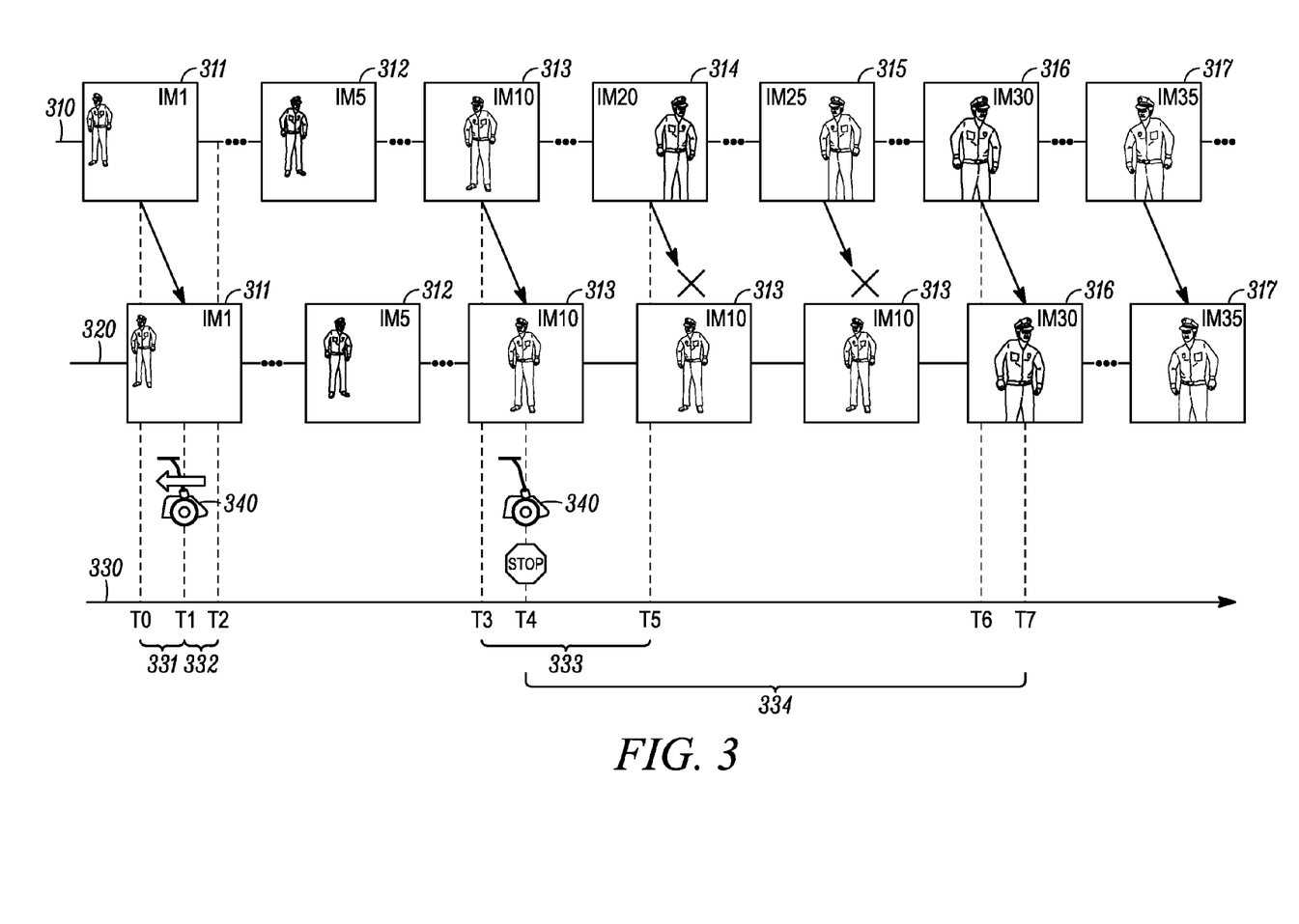
FIG. 3 depicts a sequence of images captured by a camera and subsequently displayed at a remote viewer terminal, along with example timing associated with FOV control commands, in accordance with some embodiments.

Processes performed according to various embodiments will now be described in conjunction with FIGS. 3-6. More particularly, FIG. 3 is provided to facilitate a high level explanation of the cooperative processes performed by an image capture device (e.g., image capture device 140, FIG. 1) and a remote viewer terminal (e.g., remote viewer terminal 110, FIG. 1), and to explain the camera control and viewing experiences of the remote viewer. In particular, FIG. 3 depicts a sequence of images captured by a remotely-controllable camera (e.g., image capture device 140, FIG. 1) and subsequently displayed at a remote viewer terminal (e.g., remote viewer terminal 110, FIG. 1), along with example timing associated with various FOV control commands, in accordance with some embodiments. For purpose of example, the images correspond to video of a person walking in a straight line directly toward the image capture device.

In FIG. 3, images 311-317 aligned along line 310 represent example images that are produced/transmitted by an image capture device (e.g., image capture device 140, FIG. 1) to a remote viewer terminal (e.g., remote viewer terminal 110, FIG. 1). Images 311-313, 316, 317 aligned along line 320 represent example images that have been received and displayed to a viewer at the remote viewer terminal. Finally, timeline 330 is provided to indicate the relative timing of image production/transmission, image display, and various other events, as discussed below. The relative time that each image 311-217 is produced/transmitted by the image capture device, and the relative time that each image 311-313, 316, 317 is displayed at the remote viewer terminal are depicted by their arrangements along lines 310, 320. The relative timing of the image production/transmission, image display, and other events is provided for example purposes, and the relative timing may be different in different scenarios.

As shown in FIG. 3, a sequence of images 311-317 (i.e., video) is produced by an image capture device (i.e., transmitted by the image capture device to a remote viewer terminal). According to an embodiment, at least some of the images 311-313, 316, 317 are thereafter displayed at the remote viewer terminal. For purposes of enhanced explanation, each image 311-317 is labeled with an image identifier (e.g., "IM 0," "IM 5," and so on). For example, IM 1 (image 311) may represent a first image in a sequence of images produced by the image capture device, and IM 5 (image 312) may represent a fifth image in the sequence of images produced by the image capture device. Intervening images (e.g., IM 2-IM 4) are not shown so as not to unnecessarily clutter FIG. 3. For reasons that will be explained in detail later, the image capture device identifies each image produced and transmitted by the image capture device with a unique image identifier, and stores the unique image identifier (e.g., in data storage 144, FIG. 1) along with information that defines the FOV for the image (referred to as an "FOV definition"), in an embodiment. An FOV definition is any type of information that enables the FOV of an image to be defined and later reproduced. For example, but not by way of limitation, an FOV definition may be any type of information selected from a group consisting of PTZ settings (e.g., settings of drive motors 150, FIG. 1, camera orientation information (e.g., angular offsets with respect to a fixed coordinate system), a magnification (zoom) setting, and so on), a definition of the geometrical boundaries of a sub-image (e.g., defining a subset of pixels from a wide-angle image), or any other information that enables an FOV to be defined. Either way, the image capture device transmits the unique image identifier and/or the FOV definition with the image to the remote viewer terminal, in various embodiments.

Referring now to timeline 330, assume that at the beginning of the timeline, the image capture device is not panning, but instead is producing images corresponding to a fixed FOV. At time T0, a first image 311 is produced by the image capture device and transmitted over a data path. Due to the fixed and/or variable delays inherent in the data path and the processing performed at the image capture device and the remote viewer terminal, the first image 311 is received and displayed on the remote viewer terminal at a later time, T1. Accordingly, there is a time delay 331 between the time T0 that the image capture device captures the first image 311 and the time T1 that the first image 311 is displayed on the remote viewer terminal.

Also at time T1, the remote viewer indicates (e.g., via joystick 340) that the viewer would like to remotely control the camera to pan (e.g., to the left, as indicated by the arrow overlying joystick 340). As will be explained in more detail later, the pan indication from joystick 340 causes the remote viewer terminal to transmit one or more pan commands to the image capture device over the data path. In some systems, a single pan command may be sent, and the image capture device will continue to pan in a direction indicated in the command until a pan stop command is received. In other systems, multiple pan commands may be sent (e.g., throughout the duration of time that the remote viewer pushes the joystick in a direction), and each pan command may cause the image capture device to pan by a certain increment. Either way, at time T2, the image capture device receives a first pan command, and begins panning (physically or virtually) in the indicated direction. As with conveying images, a time delay 332 is inherently present between the time T1 that the remote viewer produces the pan indication (via joystick 340) and the time T3 that the image capture device receives and processes the corresponding pan command, and begins to pan accordingly.

While panning, the image capture device continues to produce (i.e., transmit) images (e.g., images 312, 313), and the remote viewer terminal continues to receive and display the images. Accordingly, whereas the first image 311 shows the person in an upper left corner of the image, subsequent images 312, 313 produced while the image capture device is panning to the left show the person moving toward the center of the image. More particularly, the person is positioned in the center of image 313, which was transmitted by the image capture device at time T3 and received at the remote viewer terminal at time T4.

At this time, T4, the remote viewer provides an indication that the remote viewer would like the image capture device to stop panning (e.g., by releasing the joystick 340). In the given example, the remote viewer may want to keep the person centered in the displayed images as the person is walking toward the image capture device. According to an embodiment, the stop panning indication provided by the remote viewer corresponds to a selection of an image by the remote viewer, and thus to the selection of an FOV. More particularly, the image being displayed at the time when the remote viewer provides a stop panning indication (i.e., image 313) corresponds to a selected image, and the FOV of the selected image corresponds to a selected FOV. In other embodiments, the remote viewer terminal may be configured to allow the remote viewer to select a previously displayed image. Either way, as mentioned previously, a unique image identifier is associated with the selected image, and the unique image identifier and/or an FOV definition associated with the image was transmitted by the image capture device to the remote viewer terminal along with the image. Accordingly, the remote viewer terminal has knowledge of the unique image identifier and/or the FOV definition for the selected image, according to an embodiment.

When the remote viewer terminal receives a stop panning indication, the remote viewer terminal transmits a regress command to the image capture device via the data path, which command is received by the image capture device at time T5. According to an embodiment, the regress command includes a reference to the selected FOV (i.e., a reference to the FOV of the image 313 selected by the remote viewer, referred to as a "selected FOV reference"). The selected FOV reference may be, for example, the image identifier or the FOV definition for the selected image, in various embodiments. When the image capture device receives a regress command at time T5, the image capture device will stop panning, and will determine the selected FOV from the selected FOV reference that was included with the regress command. The image capture device will then "regress" to capture images having approximately the same FOV as the selected FOV. The selected FOV reference in the regress command enables the image capture device to compensate for overshoot that has occurred in the interval of time 333 between the time T3 when the image capture device transmitted the selected image 313 to the time T5 when the image capture device received and processed the regress command. More specifically, the image capture device has continued to pan during this time interval 333, and has continued to produce images while such panning was being performed. This is indicted in image 314 produced by the image capture device, in which the person in the image is positioned more toward the right side of the image 314. In other words, during the interval 333, the image capture device has overshot the selected FOV (i.e., the FOV corresponding to image 313, in which the person was centered in the image). The selected FOV reference enables the image capture device to determine and return (regress) to the selected FOV.

For an image capture device that captures wide-angle images, the image capture device may regress immediately to the selected FOV based on the selected FOV reference in the regress command (i.e., the image capture device may jump over to a region of the wide-angle image that corresponds to the selected FOV). Conversely, for an image capture device that pans by changing the physical orientation of the camera, the image capture device may regress by reversing the current direction of panning, and panning back to an orientation associated with the selected FOV. This latter scenario is depicted in the example of FIG. 3 in which, at time T5, the image capture device begins to pan in an opposite direction from the direction in which it was previously panning (i.e., between times T2 and T5), and toward an orientation associated with the selected FOV. In the illustrated example, the image capture device reaches this orientation, stops its reverse panning, and at time T6 provides the first image 316 of a series of new images 316, 317 that have approximately the selected FOV (e.g., images in which the person is centered in the image). Between the time T5 that the image capture device receives the regress command to the time T6 when the image capture device has completed its regression, the image capture device may continue to produce images (e.g., image 315). Alternatively, the image capture device may discontinue production of new images while the image capture device is regressing.

According to a regular image display protocol, the remote viewer terminal displays each received image as soon as possible from the time that each image is received. According to an embodiment, from the time T4 when the remote viewer provided the indication that the remote viewer wanted the image capture device to stop panning to the time T7 when the remote viewer received the first new image 316 in the series of images 316, 317 having the selected FOV, the remote viewer terminal may display images in an "altered" manner. As used herein, displaying images in an "altered" manner means displaying the images in a manner that is different from the regular image display protocol.

According to an embodiment, the remote viewer terminal may display images in an altered manner by freezing on the selected image 313 (i.e., persistently displaying the selected image 313) during an interval 334 of time between the time T4 when the remote viewer provided the stop panning indication to a time T7 when the remote viewer terminal receives a new image 316 corresponding to the selected FOV. During this time interval 334, the remote viewer terminal may refrain from displaying images (e.g., images 314, 315) received from the image capture device (as indicated by the "X" below images 314, 315). Instead, image 313 is depicted to be persistently displayed on the image capture device during interval 334. This provides a visual cue to the remote viewer that the camera is regressing to the selected FOV. Once a new image 316 corresponding to the selected FOV is received, the remote viewer terminal resumes displaying the received images according to the regular image display protocol.

In other embodiments, rather than persistently displaying the selected image 313, the remote viewer terminal may display images in an altered manner by displaying images received between times T4 and T7 in a manner in which the displayed FOV appears to be fixed at the selected FOV. For example, the remote viewer terminal may digitally manipulate the images (e.g., images 314, 315) received during interval 334 in a manner that warps the FOV of the received images to appear to align with the selected FOV (e.g., by "morphing" the received images). For example, while the image capture device is overshooting to the left (e.g., during time interval 334), the remote viewer terminal may digitally move and display the received images (e.g., images 314, 315) to the right in an opposing manner, in order to keep the displayed FOV reasonably close to the selected FOV.

Figure 4:
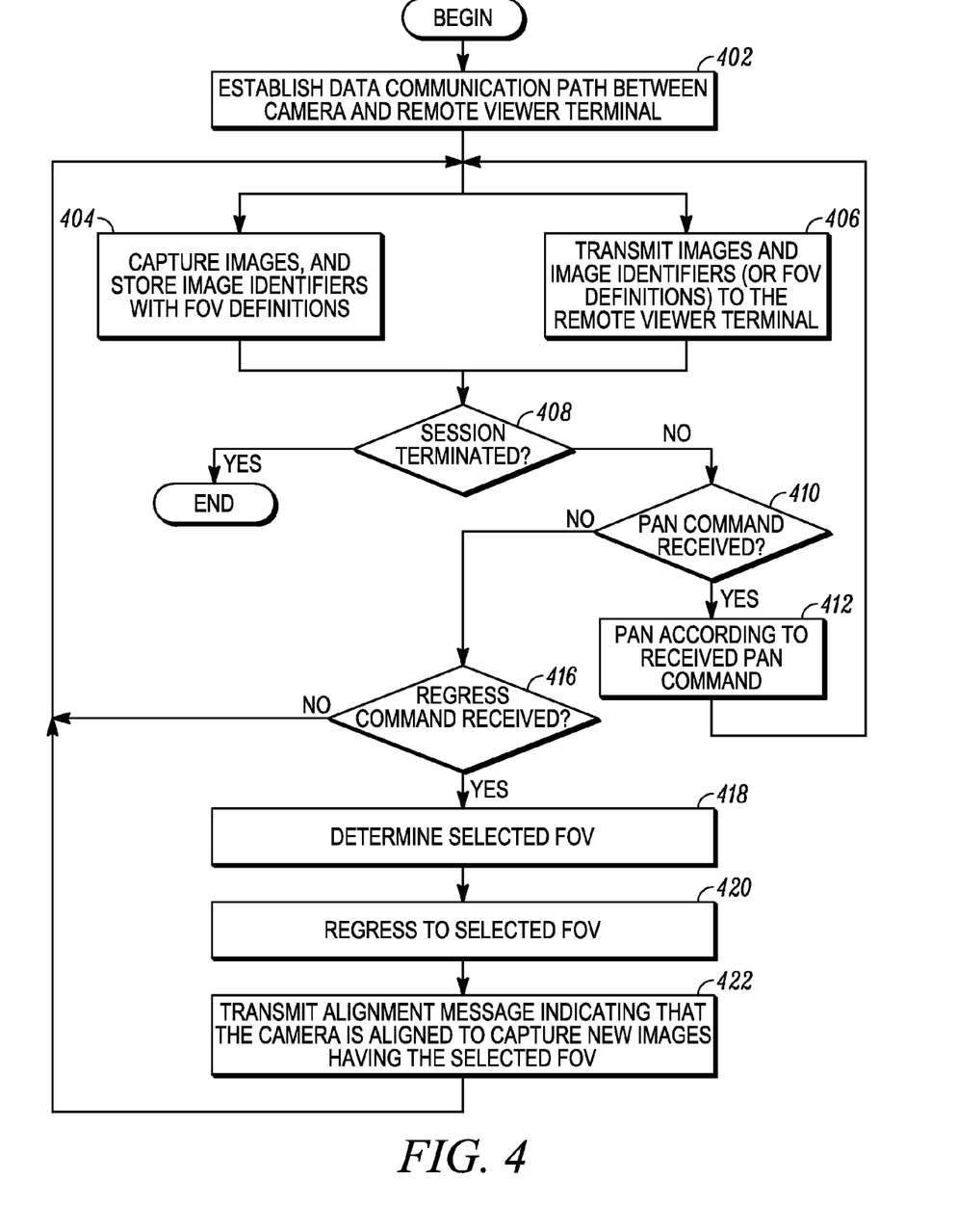
FIG. 4 is a flowchart of a method for an image capture device to compensate for overshoot of a desired field of vision, in accordance with some embodiments.
Figure 5:
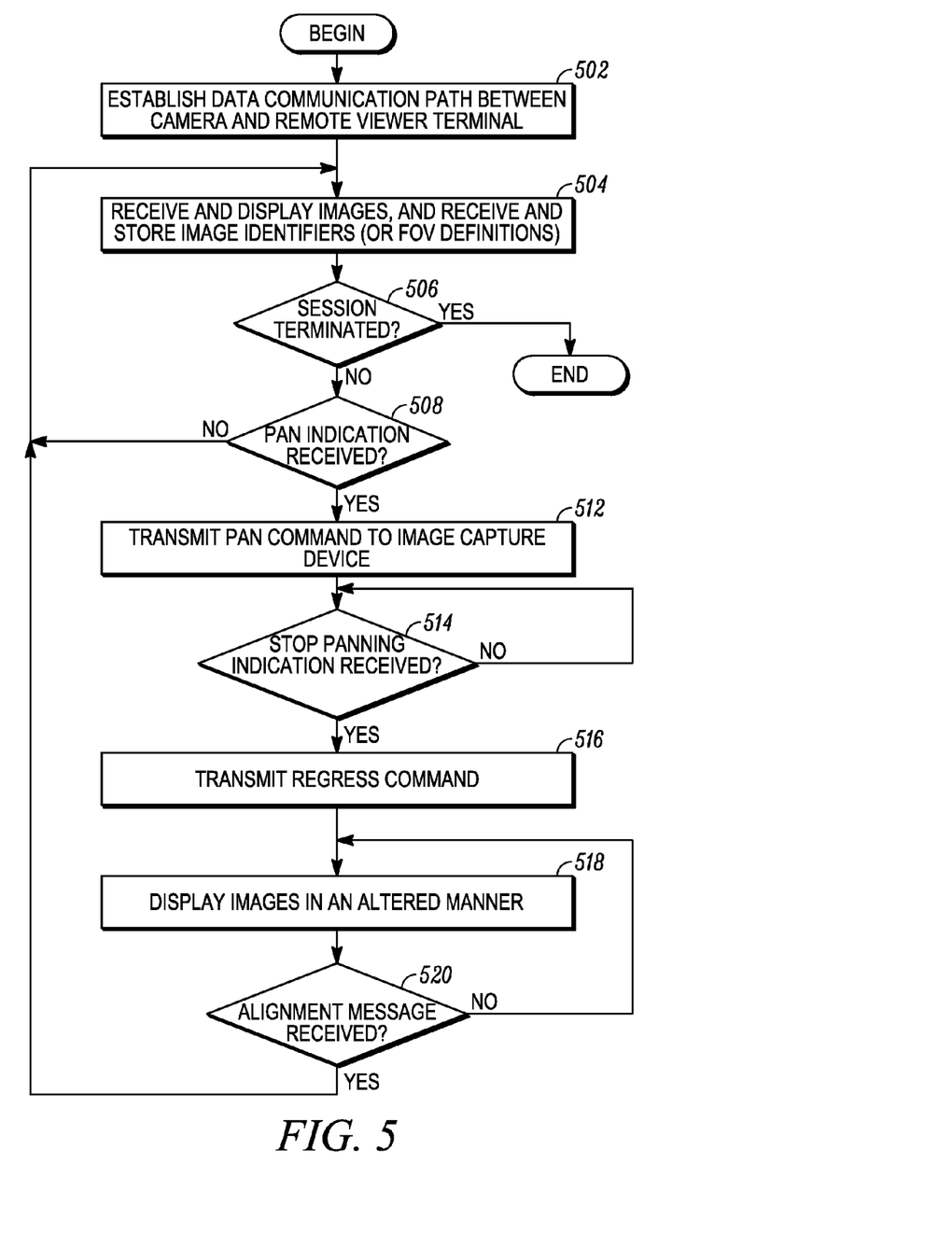
FIG. 5 is a flowchart of a portion of a method for a remote viewer terminal to compensate for overshoot of a desired field of vision, in accordance with some embodiments.

FIGS. 4 and 5 are flowcharts which, with their descriptions below, are intended to describe various embodiments in more detail. More specifically, FIGS. 4 and 5 depict processes that are performed by an image capture device and a remote viewer terminal, respectively, in conjunction with compensating for overshoot of the image capture device during panning operations. In the example of FIGS. 4 and 5, the data path serves as a conduit for images, commands, and other information exchanged between the image capture device and the remote viewer terminal. Although the data path may include one or more servers, routers, and other components, the primary functions associated with the overshoot compensation are performed by the image capture device and the remote viewer terminal. As will be explained in more detail later, in an alternate embodiment, an intermediary device (e.g., intermediary device 160, FIG. 1) along the data path may perform some functions associated with the overshoot compensation. The former embodiment will be discussed first in conjunction with FIGS. 4 and 5, which should be viewed together for enhanced understanding. More specifically, FIG. 4 is a flowchart of a method for an image capture device (e.g., image capture device 140, FIG. 1) to compensate for overshoot of a desired field of vision, and FIG. 5 is a flowchart of a portion of a method for a remote viewer terminal (e.g., remote viewer terminal 110, FIG. 1) to compensate for overshoot of a desired field of vision, in accordance with some embodiments.

With reference to FIGS. 4 and 5, the method begins, in blocks 402, 502 (FIGS. 4, 5) when image capture device (e.g., device 140, FIG. 1) and remote viewer terminal (e.g., terminal 110, FIG. 1) establish a bi-directional data communication path between them (e.g., the "data path" discussed in conjunction with FIG. 1). The data communication path is established between the image capture device and the remote viewer terminal for the purpose of conveying images and selected FOV references (e.g., image identifiers and/or FOV definitions) from the image capture device to the remote viewer terminal, and communicating FOV control commands from the remote viewer terminal to the image capture device. The data communication path may be established using SIP (Session Initiation Protocol), an NG911 protocol (a protocol in accordance with a Next Generation 911 standard published by the National Emergency Number Association), or another protocol, for example. Once the data communication path is established, an optimal capabilities negotiation may commence. For example, the image capture device may provide capabilities information to the remote viewer terminal. The capabilities information may indicate: 1) the type of image capture device and/or camera (e.g., panning camera, PT camera, PTZ camera, panoramic camera, fisheye camera, box camera, and so on); 2) capabilities of the camera (e.g., zoom capabilities, panning ranges, and so on); and 3) that the image capture device has an appropriate software application that enables embodiments of the inventive subject matter, discussed herein, to be carried out.

In block 404 (FIG. 4), the image capture device begins capturing images. From the captured images, the image capture device produces images to be transmitted (block 406) to the remote viewer terminal. As discussed previously, the image capture device also assigns a unique image identifier to each image that will be transmitted, and determines an FOV definition for each image that will be transmitted. The image identifier provides a means by which a particular image may be uniquely identified from the plurality of images that may be produced by the image capture device. The image identifier may be a timestamp, a sequence number, or another identifier uniquely identifying a particular image. According to an embodiment, the image capture device also determines an FOV definition for each image produced. As discussed previously, each produced image has an FOV that may or may not be the same as the FOV of the captured image.

According to an embodiment, the image capture device maintains a table (e.g., in data storage 144, FIG. 1) that correlates the image identifier and the FOV definition for each image to be transmitted. As discussed previously, an FOV definition defines the FOV of an image that is produced/transmitted by the image capture device (e.g., PTZ settings at an image capture time associated with the transmitted image, a definition of the geometrical boundaries of a sub-image, and/or any other information that enables an FOV of a produced image to be defined).

In block 406 (FIG. 4), which is performed in parallel with block 404, the image capture device transmits the images to the remote viewer terminal via the data path, in an embodiment. The images may be compressed prior to transmission. For example, the image capture device may use an industry standard compression technology (e.g., H264, MJPEG, or other technologies) to compress the images.

When the data path supports packet-based communications, the image capture device formats data defining the images into packets, which the image capture device transmits over the data path. According to an embodiment, the packets also convey the image identifiers for each image that is transmitted. In an alternate embodiment, the packets may convey the FOV definitions for the images, in addition to or in lieu of the image identifiers. For example, in an embodiment, the images and the image identifiers (or the FOV definitions) are communicated using Real-time Transport Protocol (RTP) packets, which include an IP header, a datagram protocol header, an RTP header, and a data field. For each image, the data defining the image is conveyed in the data field, and the image identifier (or the FOV definition) is conveyed in the RTP timestamp field or an RTP header extension (or elsewhere in the packet). In alternate embodiments, the image data and the image identifiers (or the FOV definitions) could be communicated using differently-formatted packets, or using a non-packet based communication protocol.

The image capture device continues to capture images (block 404) and produce/transmit the images (block 406) in the above-described manner until the communication session is terminated, as determined in block 408, at which point the method ends, or until a pan command is received, as determined in block 410, described later.

With reference to FIG. 5, additional processes performed by the remote viewer terminal will now be described. In block 504, the remote viewer terminal receives the images and the image identifiers (and/or FOV definitions) via the data path. The remote viewer terminal stores the images, along with the corresponding image identifiers (and/or FOV definitions). The images, image identifiers, and/or FOV definitions may be stored in local data storage (e.g., data storage 114, FIG. 1) or on a separate server or other storage device (not illustrated).

As the image data is being received, the remote viewer terminal also displays (e.g., on display 122, FIG. 1) the received images according to a regular image display protocol. Accordingly, the remote viewer may observe the streaming video captured by the image capture device. The streaming video appears to be contemporaneous with the image capture, although in actuality, the streaming video is delayed from the corresponding capture, as previously discussed.

The remote viewer terminal continues to receive and display images, image identifiers, and/or FOV definitions (block 504) in the above-described manner until the communication session is terminated, as determined in block 506, at which point the method ends, or until a pan indication is received, as determined in block 508.

According to an embodiment, as the remote viewer observes the received images, the remote viewer may, via the user interface, indicate that the remote viewer wants the image capture device to pan and/or change its magnification level, in order to change the FOV of images provided by the image capture device. For example, according to an embodiment, the remote viewer may provide an indication of a desired pan direction using a joystick (e.g., joystick 126, FIG. 1) or other user interface component. As used herein, the term "pan indication" encompasses indications of a desired pan direction, as well as indications of desired changes in magnification (e.g., zooming in and zooming out). Similarly, a "pan command" may be a command to pan in a desired pan direction or an indication to change magnification.

When no pan indication is received, the method iterates as shown. Conversely, when the remote viewer terminal determines that a pan indication has been received, in block 508, the remote viewer terminal generates and transmits one or more pan commands to the image capture device, in block 512. According to an embodiment, the remote viewer terminal transmits the pan command (and other FOV control commands) using a protocol that is built upon the Real Time Control Protocol (RTCP), although the FOV control commands could be conveyed using a different protocol, as well.

Either way, a pan command may indicate a pan (or tilt or zoom) direction and a pan (or zoom) speed (e.g., an indication of how fast to pan or to change magnification). For example, the force on the joystick may indicate the speed or magnitude of the desired panning movement, and these indications may be conveyed to the image capture device along with the directional indications. In addition, as mentioned previously, for a particular pan indication provided by a viewer, the remote viewer terminal may transmit a single pan command, which causes the image capture device to continuously pan until a contrary command is received. Alternatively, the remote viewer terminal may transmit a plurality of pan commands, where each pan command corresponds to an increment of pan movement to be performed by the image capture device. After transmitting the pan command, the remote viewer terminal may continue to receive and display images according to the regular image display protocol.

Referring again to FIG. 4, when a determination is made, in block 410, that a pan command has been received, the image capture device initiates panning according to the received pan command (e.g., in a direction and with a speed indicated in the pan command), in block 412. While panning, the image capture device continues to capture and transmit images (blocks 404, 406), and the method iterates as shown.

Referring again to FIG. 5, after a pan command has been transmitted to the image capture device, in block 512, the remote viewer terminal waits to receive a stop panning indication, in block 514, while the remote viewer terminal continues to receive and display images. For example, the remote viewer may, via the user interface, indicate that the remote viewer wants the image capture device to stop panning and/or to stop changing its magnification level, by releasing the joystick, or by providing some other input to a user interface component. As mentioned previously, provision of a stop panning indication corresponds to the selection of an image (e.g., the image most recently displayed) and, correspondingly, to the selection of a desired FOV. Alternatively, along with displaying received images in a real-time manner (e.g., in a primary window or area of the display), the remote viewer terminal may display one or more previously-displayed images (e.g., in a secondary window or area of the display), or may provide some other way of accessing previously-displayed images. In such an embodiment, the viewer may indicate a selected image and a selected FOV by selecting one of the previously-displayed images.

In either case, when a stop panning indication is received, as indicated in block 514, the remote viewer terminal determines the image identifier for the selected image, in an embodiment. In embodiments in which the remote viewer terminal also or alternatively received an FOV definition for the selected image, the remote viewer terminal also may access the FOV definition (e.g., based on the image identifier). The remote viewer terminal then generates and transmits a regress command to the image capture device, in block 516. The regress command may include, for example, the image identifier for the selected image and/or the FOV definition for the selected image.

According to an embodiment, after transmitting the regress command, the remote viewer terminal displays images in an altered manner (i.e., a manner that is different from the regular image display protocol), in block 518. For example, the remote viewer terminal may display images in an altered manner by refraining from displaying images newly received from the image capture device, and instead persistently displaying the selected image. Alternatively, the remote viewer terminal may digitally manipulate the images received after receiving the stop panning indication in a manner that warps the FOV of the received images to appear to align with the selected FOV.

Referring again to FIG. 4, when a regress command is received while the image capture device is panning (or changing its magnification level), as indicated in block 416), the image capture device determines a selected FOV based on the information in the regress command, in block 418. For example, when the regress command includes an image identifier for a selected image, the image capture device may retrieve (e.g., from data storage 144, FIG. 1) an FOV definition corresponding to the image identifier. As discussed previously, the FOV definition may include PTZ settings, a definition of the geometrical boundaries of a sub-image, or any other information that enables an FOV to be defined. Alternatively, the regress command may include the FOV definition. Either way, the image capture device identifies a selected FOV to be an FOV that is consistent with the FOV definition for the selected image.

During the panning operations, the image capture device likely has overshot the selected FOV, as discussed in detail previously. Accordingly, in block 420, the image capture device regresses to the selected FOV. When the image capture device physically re-orients its camera in order to pan, regression may include reversing its current panning direction, and panning in the reverse direction until the image capture device has positioned its camera in an orientation corresponding to the selected FOV, in an embodiment. While regressing, the image capture device may or may not produce and transmit additional images. Alternatively, when the image capture device captures wide-angle images and virtually pans, the image capture device may immediately regress to produce images with the selected FOV by producing images defined by pixel sub-sets that correspond to the selected FOV.

Either way, according to an embodiment, once the image capture device has regressed, and is capable of producing new images with the selected FOV, the image capture device generates and transmits an alignment message to the remote viewer terminal, in block 422. The alignment message indicates that the image capture device has regressed to the selected FOV, so that the image capture device may produce images having substantially the selected FOV (e.g., in blocks 404, 406). The alignment message may be transmitted via an out-of-band RTCP message, an in-band RTP header extension (e.g., by including the identifier or selected FOV definition received from the remote viewer terminal), or another signaling mechanism.

Referring once more to FIG. 5, when an alignment message has been received, as determined in block 520, the remote viewer terminal resumes displaying the received images according to the regular image display protocol.

As discussed above, in the example of FIGS. 4 and 5, the data path serves primarily as a conduit for images, commands, and other information exchanged between the image capture device and the remote viewer terminal, and the primary functions associated with overshoot compensation are performed by the image capture device and the remote viewer terminal. In an alternate embodiment, an intermediary device (e.g., intermediary device 160, FIG. 1) along the data path may perform some functions associated with the overshoot compensation. More particularly, the intermediary device and the remote viewer terminal may together be considered an image viewing system, which communicates with the image capture device.

In an embodiment that includes an intermediary device, all images are routed through the intermediary device (e.g., a wireless transcoding server, Network Video Recorder or the like). More particularly, the intermediary device receives the plurality of images from the image capture device and communicates the plurality of images to the remote viewer terminal. In addition, in an embodiment, the intermediary device receives a plurality of image identifiers (and/or FOV definitions) from the image capture device in conjunction with the plurality of images, and stores the plurality of image identifiers (and/or the FOV definitions) in a manner that they are correlated with the plurality of images.

The remote viewer terminal causes the plurality of images to be displayed on the display device. When the remote viewer terminal receives an indication to pan, the remote viewer terminal sends a pan command to the intermediary device, which the intermediary device forwards to the image capture device. According to an embodiment, when the remote viewer terminal receives an indication to stop panning, the remote viewer terminal transmits a stop panning command to the intermediary device in response to receiving the indication. The intermediary device identifies, in response to receiving the stop panning command, a selected image that was being displayed when the indication to stop the panning was received. The intermediary device also identifies a selected image identifier (and/or an FOV definition) that corresponds to the selected image. The intermediary device transmits a regress command to the image capture device with the selected image identifier (and/or the FOV definition) as a reference to the selected FOV.

In another embodiment, the intermediary device keeps track of FOV definitions on an image-by-image basis (or a less frequent basis) via periodic FOV definition query calls to the image capture device. More particularly, the intermediary device transmits a plurality of FOV queries to the image capture device, and the intermediary device receives and stores a corresponding plurality of FOV definitions from the image capture device, which the image capture device provided in response to the FOV queries.

In yet another alternate embodiment, the intermediary device may be equipped with a model of the image capture device's optics and PTZ drive system. The intermediary device may monitor the stream of FOV control commands (e.g., pan and/or zoom commands), apply them to its model of the image capture device, and issue relative reversed FOV control commands to cause the image capture device to regress to the requested FOV. According to another embodiment, the intermediary device may determine a set of forward panning commands that have been transmitted to the image capture device after the image capture device captured the selected image. The intermediary device may then structure the regress command as one or more reverse panning commands intended to reverse the camera panning performed by the image capture device in response to having executed the set of forward panning commands.

In the foregoing specification, specific embodiments of have been described. For example, an embodiment of a method for compensating for overshoot is performed in a system that includes a remote viewer terminal and an image capture device that is controllable to change a FOV, with respect to a fixed coordinate system, of images produced by the image capture device. The method includes the steps of producing, by the image capture device, a plurality of images associated with a plurality of FOVs, and transmitting, over a data path, the plurality of images produced by the image capture device. The method also includes receiving, over the data path, a regress command that includes a reference to a selected FOV of the plurality of FOVs, and in response to receiving the regress command, producing additional images associated with the selected FOV.

Another embodiment of a method for compensating for overshoot is performed in a system that includes an image capture device and a viewing system, which communicate with each other over a data path. The method is performed by the viewing system and includes receiving, over the data path, a plurality of images captured by the image capture device as the image capture device pans through a plurality of FOVs, and causing the plurality of images to be displayed on a display device of the viewing system in a sequential manner. The method also includes receiving an indication to stop panning at a selected FOV of the plurality of FOVs, wherein the selected FOV corresponds to a selected image of the displayed images, transmitting, to the image capture device over the data path, a regress command intended to cause the image capture device to regress to the selected FOV, and causing the plurality of images to be displayed on the display device in an altered manner.

An embodiment of an image capture device includes a camera, a data path interface, and a processing system. The camera is configured to produce a plurality of images associated with a plurality of FOVs. The processing system is configured to transmit, via the data path interface, the plurality of images produced by the camera, and to receive, via the data path interface, a regress command that includes a reference to a selected FOV of the plurality of FOVs. The processing system is further configured to control the camera to produce additional images associated with the selected FOV.

An embodiment of an image viewing system includes a remote viewer terminal having a display device and a data path interface. The remote viewer terminal is configured to receive, via the data path interface, a plurality of images captured by the image capture device as the image capture device pans through a plurality of FOVs, and to cause the plurality of images to be displayed on the display device in a sequential manner. The remote viewer terminal is further configured to receive an indication to stop panning at a selected FOV of the plurality of FOVs, wherein the selected FOV corresponds to a selected image of the displayed images, and to transmit, to the image capture device via the data path interface, a regress command intended to cause the image capture device to regress to the selected FOV. The remote viewer terminal is further configured to cause the plurality of images to be displayed on the display device in an altered manner. The image viewing system also may include an intermediary device that performs some of the functions associated with overshoot compensation.

One of ordinary skill in the art appreciates that various modifications and changes can be made from the above-described embodiments without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed in a system that includes a remote viewer terminal and a camera that is controllable to change a field of vision (FOV), with respect to a fixed coordinate system, of images produced by the camera, the method comprising: receiving a pant, tilt, zoom (PTZ) command by the camera, wherein the PTZ command causes a camera to change its FOV by rotating about an axis, or by zooming the camera; using PTZ drive system to physically or virtually change the FOV of the camera by rotating the camera about the axis, or by zooming the camera; while in the process of changing the FOV of the camera by rotating the camera about the axis, and/or by zooming the camera, producing, by the camera, a plurality of images associated with a plurality of FOVs; associating each of the plurality of images with an image identifier, wherein each image identifier has a PTZ setting of drive motors that rotate the camera about the axis, and/or zoom the camera; transmitting, over a data path, the plurality of images produced by the camera along with their image identifiers comprising the PTZ settings of drive motors that rotate the camera about the axis, and/or zoom the camera; receiving an indication to stop using PTZ drive system to change the FOV of the camera; receiving, over the data path, a regress command that includes an image identifier for a selected FOV of the plurality of FOVs, wherein the regress command comprises an indication to the camera that it should stop panning in a direction in which it has been panning; associating the image identifier for the selected FOV to a PTZ setting; and in response to receiving the regress command, producing, by the camera, additional images associated with the selected FOV by directing the PTZ drive system to the PTZ settings.

2. The method of claim 1, wherein the camera includes a drive system that is capable of physically moving the camera to various orientations in order to change the FOVs of the images produced by the camera, and wherein:
producing the plurality of images comprises controlling the drive system to pan, tilt or zoom the camera through a plurality of camera orientations while capturing the plurality of images; and
producing the additional images comprises controlling the drive system to pan, tilt or zoom the camera to an orientation associated with the selected FOV, and to produce the additional images while the camera is in the orientation.

3. The method of claim 2, further comprising:
when the drive system has moved the camera to the orientation, transmitting a message, over the data path that indicates that the camera is aligned with the orientation associated with the selected FOV.

4. The method of claim 1, wherein:
producing the plurality of images comprises capturing wide-angle images, and selecting sub-images associated with different FOVs within at least one of the wide-angle images as the plurality of images; and
producing the additional images comprises capturing additional wide-angle images and selecting sub-images associated with the selected FOV from at least one of the additional wide-angle images.

5. The method of claim 4, further comprising:
when the sub-images associated with the selected FOV are selected, transmitting a message, over the data path that indicates that the camera is producing images associated with the selected FOV.

6. The method of claim 1, wherein the camera system also includes data storage, and the method further comprises:
assigning a plurality of image identifiers to the plurality of images, wherein each of the plurality of image identifiers corresponds to one of the plurality of images;
storing, in the data storage, the plurality of image identifiers and a plurality of FOV definitions, wherein for each image identifier, an FOV definition defines an FOV of an image corresponding to the image identifier;
transmitting the plurality of image identifiers over the data path in conjunction with the plurality of images; and
wherein the regress command includes a selected image identifier of the plurality of image identifiers as the reference to the selected FOV, and in response to receiving the regress command, the camera retrieves an FOV definition corresponding to the selected image identifier from the data storage.

7. The method of claim 6, wherein each of the plurality of FOV definitions includes information selected from at least one of the following: a pan angle of the camera when an image was captured, a tilt angle of the camera when the image was captured, a magnification level of the camera when the image was captured, or a boundary of a sub-image within a wide-angle image captured by the camera.

8. The method of claim 1, wherein the camera transmits the plurality of images to an intermediary device, and the method further comprises:
receiving a plurality of FOV queries from the intermediary device; and
in response to receiving each of the plurality of FOV queries, transmitting an FOV definition indicating a current FOV of images captured by the camera to the intermediary device, and
wherein the regress command includes the FOV definition corresponding to a selected image of the plurality of images as the reference to the selected FOV.

9. The method of claim 1, further comprising:
in conjunction with transmitting an image of the plurality of images captured by the camera, transmitting an FOV definition that defines an FOV at a time when the image was captured,
wherein the regress command includes the FOV definition as the reference to the selected FOV.

10. A method performed in a system that includes an camera and a viewing system, which communicate with each other over a data path, the method performed by the viewing system and comprising:
receiving, over the data path, a plurality of images captured by the camera as the camera pans through a plurality of fields of vision (FOVs) by using drive motors, wherein the images are received with image identifiers having PTZ settings of drive motors that rotate the camera about an axis and/or zoom the camera;
causing the plurality of images to be displayed on a display device of the viewing system in a sequential manner;
receiving an indication to stop panning at a selected field of vision (FOV) of the plurality of FOVs, wherein the selected FOV has an associated image identifier and corresponds to a selected image of the displayed images, wherein each image identifier has a PTZ setting of drive motors that rotate the camera about the axis, and/or zoom the camera;
transmitting, to the camera over the data path, a regress command containing the image identifier having the PTZ setting of drive motors that rotate the camera about the axis, and/or zoom the camera, and intended to cause the camera to stop panning and regress to the selected FOV by associating the image identifier with a PTZ setting used when capturing the selected FOV; and
causing the plurality of images to be displayed on the display device in an altered manner.

11. The method of claim 10, further comprising:
receiving from the camera over the data path, a subsequent plurality of images captured by the camera after the camera has overshot the selected FOV, and
wherein causing the plurality of images to be displayed in the altered manner comprises continuing to display the selected image instead of displaying the subsequent plurality of images.

12. The method of claim 10, further comprising:
receiving from the camera over the data path, a subsequent plurality of images captured by the camera after camera has overshot the selected FOV, and
wherein causing the plurality of images to be displayed in the altered manner comprises displaying the subsequent plurality of images in a manner in which a displayed FOV appears to be fixed at the selected FOV.

13. The method of claim 10, further comprising:
receiving, over the data path, a message that indicates that the camera is aligned to capture additional images with the selected FOV;
receiving, over the data path, a subsequent plurality of images captured by the camera after the camera is aligned to capture the additional images; and
causing the subsequent plurality of images to be displayed on the display device in the sequential manner.

14. The method of claim 10, further comprising:
receiving, from the camera over the data path, a plurality of image identifiers in conjunction with the plurality of images, and
wherein the at least one regress command includes a selected image identifier of the plurality of image identifiers as a reference to the selected FOV.

15. The method of claim 10, further comprising:
receiving, over the data path, an FOV definition that defines the selected FOV, and
wherein the at least one regress command includes the FOV definition as a reference to the selected FOV.

16. The method of claim 10, wherein the viewing system includes a remote viewer terminal and an intermediary device that is between the remote viewer terminal and the camera, and wherein:
the intermediary device receives the plurality of images from the camera and communicates the plurality of images to the remote viewer terminal;
the intermediary device receives a plurality of image identifiers from the camera in conjunction with the plurality of images;
the intermediary device stores the plurality of image identifiers in a manner that the plurality of image identifiers are correlated with the plurality of images;
the remote viewer terminal causes the plurality of images to be displayed on the display device;
the remote viewer terminal receives the indication to stop the panning;
the remote viewer terminal transmits a stop panning command to the intermediary device in response to receiving the indication;
the intermediary device identifies, in response to receiving the stop panning command, a selected image of the plurality of images that was being displayed when the indication to stop the panning was received;
the intermediary device identifies a selected image identifier from the plurality of image identifiers, wherein the selected image identifier corresponds to the selected image; and
the intermediary device transmits the regress command to the camera with the selected image identifier as a reference to the selected FOV.

17. The method of claim 10, wherein the viewing system includes a remote viewer terminal and an intermediary device that is between the remote viewer terminal and the camera, and wherein:
the intermediary device receives the plurality of images from the camera and communicates the plurality of images to the remote viewer terminal;
the intermediary device receives, from the camera, a plurality of FOV definitions, each of which defines an FOV associated with an image;
the intermediary device stores the FOV definitions in a manner that the FOV definitions are correlated with the plurality of images;
the remote viewer terminal causes the plurality of images to be displayed on the display device;

the remote viewer terminal receives the indication to stop the camera panning;

the remote viewer terminal transmits a stop panning command to the intermediary device in response to receiving the indication;

the intermediary device identifies, in response to receiving the stop panning command, a selected image of the plurality of images that was being displayed when the indication to stop the camera panning was received;

the intermediary device identifies a selected FOV definition from the plurality of FOV definitions, wherein the selected FOV definition corresponds to the selected image; and the intermediary device transmits the regress command to the camera with the selected FOV definition as a reference to the selected FOV.

18. The method of claim 10, further comprising:

determining a set of forward panning commands that have been transmitted to the camera after the camera captured the selected image; and structuring the regress command as a reverse panning command intended to reverse the camera panning performed by the camera in response to having executed the set of forward panning commands.

19. An camera comprising:

a camera configured to produce a plurality of images associated with a plurality of fields of vision (FOVs) using the PTZ drive system;

a PTZ drive system comprising drive motors that rotate the camera about an axis, and/or zoom the camera;

the camera configured to produce an image identifier for each of the plurality of images, wherein each image identifier has an associated PTZ setting of the drive motors that rotate the camera about the axis, and/or zoom the camera;

a data path interface; and a processing system configured to transmit, via the data path interface, the plurality of images produced by the camera along with their image identifiers comprising the PTZ settings of drive motors that rotate the camera about the axis, and/or zoom the camera, receive, via the data path interface, a regress command that includes an image identifier to a selected FOV of the plurality of FOVs, wherein the regress command comprises an indication to the camera that it should stop panning in a direction in which it has been panning; and associate the image identifier to a PTZ setting for the image; and control the PTZ drive system based on the PTZ setting to produce additional images associated with the selected FOV.

20. The camera of claim 19, further comprising:

one or more drive motors coupled to the camera, which are capable of physically moving the camera to various orientations in order to change the FOVs of the images produced by the camera.

21. The camera of claim 19, wherein the camera is configured to produce the plurality of images by capturing wide-angle images, and selecting sub-images associated with different FOVs within at least one of the wide-angle images as the plurality of images.

22. The camera of claim 19, further comprising:

data storage; and wherein the processing system is further configured to:

assign a plurality of image identifiers to the plurality of images, wherein each of the plurality of image identifiers corresponds to one of the plurality of images, store, in the data storage, the plurality of image identifiers and a plurality of FOV definitions, wherein for each image identifier, an FOV definition defines an FOV of the camera when an image corresponding to the image identifier was captured, transmit the plurality of image identifiers via the data path interface in conjunction with the plurality of images, and wherein the regress command includes a selected image identifier of the plurality of image identifiers as the reference to the selected FOV, and in response to receiving the regress command, the processing system retrieves an FOV definition corresponding to the selected image identifier from the data storage.

23. The camera of claim 19, wherein the processing system is further configured to:

in conjunction with transmitting each of the plurality of images produced by the camera, transmit an FOV definition that defines an FOV at a time when the image was captured, wherein the regress command includes the FOV definition as the reference to the selected FOV.

24. An image viewing system comprising:

a remote viewer terminal that includes a display device and a data path interface, wherein the remote viewer terminal is configured to receive, via the data path interface, a plurality of images captured by the camera as the camera pans through a plurality of FOVs, receive image identifiers for each of the plurality of images captured;

cause the plurality of images to be displayed on the display device in a sequential manner, receive an indication to stop panning at a selected FOV of the plurality of FOVs, wherein the selected FOV corresponds to a selected image of the displayed images, transmit, to the camera via the data path interface, a regress command that causes the image-capture device to stop panning, wherein the regress command containing an image identifier for the selected FOV, wherein each image identifier has a PTZ setting of drive motors that rotate the camera about the axis, and/or zoom the camera by utilizing drive motors, the regression command intended to cause the camera to associate the image identifier for the selected FOV to a PTZ setting, and regress to the selected FOV by using the selected PTZ settings, and cause the plurality of images to be displayed on the display device in an altered manner.

25. The image viewing system of claim 24, wherein the remote viewer terminal is further configured to:

receive, from the camera via the data path interface, a plurality of image identifiers in conjunction with the plurality of images, and wherein the regress command includes a selected image identifier of the plurality of image identifiers as a reference to the selected FOV.

26. The image viewing system of claim 24, wherein the remote viewer terminal is further configured to:
- receive, via the data path interface, an FOV definition that defines the selected FOV, and
- wherein the regress command includes the FOV definition as a reference to the selected FOV.

* * * * *